United States Patent Office 3,215,731
Patented Nov. 2, 1965

3,215,731
METHOD FOR THE PREPARATION OF GLYCOL MONOESTERS OF ACRYLIC AND METHACRYLIC ACIDS
Charles R. Bearden, Lake Jackson, and Sampse R. Hargis, Jr., Brazoria, Tex., assignors to The Dow Chemical Company, Midland, Mich., a corporation of Delaware
No Drawing. Filed Dec. 11, 1963, Ser. No. 329,905
7 Claims. (Cl. 260—486)

This application is a continuation-in-part of our application Serial No. 91,657, filed February 27, 1961, and now abandoned.

This invention relates to the preparation of 2-hydroxy ethyl esters of acrylic and methacrylic acids. More particularly, it relates to the production of these esters by the reaction of ethylene carbonate with either acrylic acid or methacrylic acid in the presence of an improved catalyst material for such reaction.

It has been known heretofore to effect the preparation of 2-hydroxy ethyl acrylate and of the corresponding methacrylate by reaction between ethylene carbonate and the required acid. The uncatalyzed reaction is, however, impractically slow and gives rise to substantial amounts of by-product materials. Both acidic and basic catalysts have been employed with some success in regard to bringing about a reasonably practical reaction rate. None of these, however, have satisfactorily avoided the formation of excessive amounts of by-products. Accordingly, no truly satisfactory method has hitherto been available for carrying out the instant reaction.

In particular, it has been found that when acidic catalysts, such as benzene sulfonic acid, are employed the yield of the desired product is generally undesirably low due to the formation of relatively large amounts of by-product impurities of higher boiling point than the desired product. These by-product materials, as shown by infrared analysis, are esters of substituted propionic acids which result from the addition of reactive moieties to the double bond in the 2-hydroxy ethyl acrylate. Thus, acrylic acid itself can add to the double bond of the ester to give a substituted propionic acid ester. Such side reaction has a two-fold effect on the yield of product. To the extent that it occurs it removes reactant acid and additionally alters already formed product.

Basic catalysts, such as pyridine or other tertiary amine, have been employed with similar results. With the basic catalysts a higher yield of the desired ester is possible than is the case when an acid catalyst is used, but the reaction product contains an undesirably large percentage of the above described substituted propionic acid derivatives.

It is, therefore, a principal object of the present invention to provide an improved method of preparing 2-hydroxy ethyl esters of acrylic acid and methacrylic acid by reaction of ethylene carbonate with the appropriate acid. More specifically, it is an object of the invention to provide an improved catalyst material whereby the said reaction may be made to yield the desired product in substantially quantitative yield. The attainment of these and related objects will be apparent from the following description of the invention.

According to the invention 2-hydroxy ethyl esters of acrylic acid or methacrylic acid are produced in high purity and in substantially quantitative yield by carrying out the reaction between the acid and ethylene carbonate in the presence of, or in contact with, both a tertiary amine and a strongly basic anion exchange resin. It has been discovered that the use of such combination of catalyst material leads to a substantially quantitative yield of the desired product of high purity.

A "strongly basic anion exchange resin" means an anion exchange resin which when added as a 10 gram portion of the basic form thereof to 100 cc. of a 0.1-normal aqueous sodium chloride solution forms a mixture having a pH value of 11 or higher. Such resins usually comprise insoluble aromatic cross-linked vinyl copolymers, e.g. a copolymer of a predominant amount of styrene cross-linked with a minor proportion, preferably from 1 to 16 percent by weight of divinylbenzene, containing substituent groups having the general formula

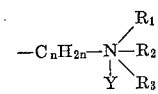

in which $n$ is an integer of value one to four, $R_1$ and $R_2$ individually, are hydrocarbon or mono- or dihydroxyalkyl, $R_3$ is hydrocarbon, and collectively $R_1$, $R_2$ and $R_3$ can be trivalent hydrocarbon group

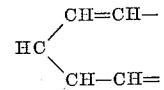

and Y is an anion such as a chloride, a sulfate, a nitrate or a hydroxyl ion. The quaternary ammonium anion exchange resins are prepared by reacting the insoluble cross-linked aromatic vinyl copolymer containing haloalkyl radicals of the formula $—C_nH_{2n}X$ wherein $n$ is an integer from one to four and X is a halogen selected from the group consisting of chlorine and bromine, with a tertiary amine, e.g. trimethylamine, dimethylethanolamine, pyridine, etc. Suitable strongly basic anion exchange resins and methods of making the same are described in United States Patents Nos. 2,591,573; 2,597,440; 2,597,494; 2,689,833; 2,725,361; 2,874,132 and in British specifications Nos. 654,706; 659,353; 779,994 and 779,995. Composite exchange resins prepared from the strongly basic anion exchange resins and suitable for use as catalyst material in the practice of the invention and a method of making the same are described in Examples 2, 4, 6, 8, 9, and 10 of United States Patent No. 3,041,292. In brief, the composite ion exchange resins are prepared by impregnating or absorbing into the granules of a strongly basic anion exchange resin, a quantity of a polymerizable monomer, e.g. acrylic acid, methacrylic acid, vinylbenzene sulfonic acid, vinylpyridine, or vinylsulfonic acid, usually in an amount approximately chemically equivalent to the quaternary ammonium groups in the anion exchange resin starting material, and polymerizing the monomer therein to inseparably integrate the monomer into the anion exchange resin granule and form a composite polymeric ion exchange body.

As ordinarily obtained, anion exchange resins contain a substantial amount, e.g. from 35 to 55 percent by weight, of moisture. For use in the practice of the present invention, it is desirable that they be dried to a moisture content not in excess of about 20 percent, preferably to 10 percent by weight or lower.

The resin component of the catalyst system is insoluble in the reaction mixture and may be recovered therefrom by decantation, filtration or like method. It can be re-used in subsequent reactions without further preparation with manifest economy in both material and processing costs.

Specifically, the tertiary amine component of the catalyst material is one that has a dissociation constant in water at 25° C. of from about $1 \times 10^{-8}$ to about $1 \times 10^{-10}$.

Among suitable amines that may be employed are: pyridine, quinoline, ethylpyridine and β-picoline.

The reaction may be most conveniently carried out in a pressure vessel inasmuch as higher reaction temperatures are possible than is the case of reaction conducted at atmospheric pressure. A shortened reaction time is obtained thereby. The reaction yields carbon dioxide and the pressure within the reactor may be controlled by venting of the carbon dioxide formed.

The reaction can be carried out batchwise or in continuous manner, e.g. by contacting a liquid mixture of the reactants including the tertiary amine, with a bed of the anion exchange resin at reaction temperatures and under pressure.

Because of the reaction being carried out at elevated temperatures, it is advisable that the reaction mixture contain an inhibitor for the polymerization of both the acid reactant and of the polymerizable product. Accordingly, the pressure within the reactor should be such that the reactants are in liquid form under the conditions employed. As a practical matter this end will be accomplished by maintaining the pressure at a value between 50 and 100 p.s.i.g.

The reaction may, of course, be carried out at atmospheric pressure if desired.

No solvent for the reaction mixture is necessary. If one is employed, and if the reaction is to be carried out at atmospheric pressure, it should be one of sufficiently high boiling point that its presence will not interfere with the attaining of the desired reaction temperature. Representative suitable inert solvents for the reaction mixture includes benzene, toluene, and xylene.

The reaction according to the present invention is suitably carried out at a temperature within the range of from 80° C. to 125° C. At lower temperature the reaction is slower, and at temperatures higher than 125° C. it will ordinarily be necessary to use a closed pressure resistant reactor.

The reaction is one between equimolar quantities of either acrylic acid or methacrylic acid and of ethylene carbonate. In order to insure completeness of the reaction, however, it is desirable to employ a slight excess of the ethylene carbonate. Thus, the reaction mixture will advantageously contain from about 1.05 to 1.2 mols of ethylene carbonate per 1 mol of the acid.

The quaternary ammonium anion exchange resin is employed in an amount equal to from about 5 to about 20 percent by weight of the combined weight of the acid and the ethylene carbonate used. The tertiary amine will generally represent from about 1 to about 4 percent of this combined weight. The proportion of the catalyst material can vary within wide limits.

The invention is illustrated by the following non-limiting examples, wherein, unless otherwise indicated, all parts and percentages are on a weight basis.

*Example 1*

A charge of 5 parts of acrylic acid containing 0.04 percent by weight of p-methoxy phenol as polymerization inhibitor, 6.7 parts of ethylene carbonate, 0.37 part of pyridine and 1.1 parts of a dried strongly basic quarternary ammonium anion exchange resin in the form of particles of sizes between 20 and 50 mesh per inch as determined by U.S. Standard screens, was placed in a 5 gallon glass lined reactor, equipped with a stirrer and means for heating and cooling the same. The anion exchange resin employed as the catalyst material was a strongly basic quarternary ammonium anion exchange resin prepared by the reaction of dimethylethanolamine with an insoluble cross-linked copolymer of about 92 percent by weight of a monovinyl aromatic hydrocarbon and about 8 percent by weight of a divinyl aromatic hydrocarbon, which copolymer contained chloromethyl radicals attached to carbon atoms of aromatic nuclei in the copolymer. The anion exchange resin contained functional groups of the formula

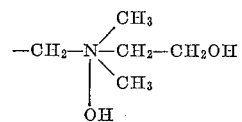

attached to carbon atoms in aromatic nuclei of the copolymer. The anion exchange resin catalyst material was in its basic hydroxide form and contained 15 percent by weight of water. The reactor was closed and heated to bring the temperature of the contents to 125° C. at which temperature the reaction mixture was maintained during approximately 12 hours or until carbon dioxide ceased to evolve. During the reaction period the pressure within the reactor was maintained at 80 p.s.i.g. by controlled venting of the carbon dioxide formed in the reaction. The reactor and contents were then cooled to room temperature. The reaction mixture was separated from the resin catalyst component by filtering. The filtrate, without further purification was analyzed by infrared analysis. It was found to consist of 93 percent by weight of 2-hydroxy ethyl acrylate.

*Example 2*

The experiment described in Example 1 was repeated with the substitution of 6 parts of methacrylic acid for the acrylic acid used in said example. Infra-red analysis of the reaction product showed it to consist of 94 percent by weight of 2-hydroxy ethyl methacrylate.

*Example 3*

The preparation described in Example 1 is repeated with the substitution of an equivalent amount each of the following tertiary amines for the pyridine used in said example: quinoline, ethyl pyridine and β-picoline. In each case the reaction mixture is found to contain an amount of 2-hydroxy ethyl acrylate corresponding substantially to a quantitative yield of said product.

*Example 4*

The experiment of Example 1 is repeated with the substitution of an equal weight of the strongly basic quaternary ammonium anion exchange resin in the chloride form. The product is found to consist of 2-hydroxy ethyl acrylate in a purity of greater than 95 percent and is obtained in a substantially quantitative yield.

We claim:

1. A process for the preparation of a 2-hydroxy ethyl ester of an ethylenically unsaturated carboxylic acid, which process comprises contacting (1) a monoethylenically unsaturated aliphatic carboxylic acid selected from the group consisting of acrylic acid and methacrylic acid, and (2) ethylene carbonate with one another and with a tertiary amine having a dissociation constant between $1 \times 10^{-8}$ and $1 \times 10^{-10}$ and an insoluble strongly basic quaternary ammonium anion exchange resin that is the reaction product of an insoluble cross-linked copolymer of a predominant amount of a monovinyl aromatic hydrocarbon and a minor amount of a divinyl aromatic hydrocarbon having halomethyl radicals on aromatic nuclei in the copolymer and a tertiary amine, at reaction temperatures between about 80° and 125° C. and recovering the 2-hydroxy ethyl ester product.

2. A process as claimed in claim 1 wherein the teritary amine is pyridine.

3. A process as claimed in claim 1 wherein the carboxylic acid is acrylic acid.

4. A process as claimed in claim 1 wherein the carboxylic acid is methacrylic acid.

5. A process as claimed in claim 1 wherein the strongly basic quaternary ammonium anion exchange resin catalyst material, is an insoluble cross-linked copolymer of a predominant amount of an aromatic monovinyl compound and a minor amount of an aromatic divinyl hydrocarbon, containing on the aromatic nuclei substituent groups having the formula

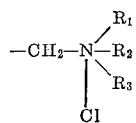

wherein $R_1$ represents monovalent hydrocarbon groups and $R_2$ and $R_3$ each represents monovalent hydrocarbon and monovalent hydroxy alkyl groups, the number of said substituent groups being at least one for every 15 aromatic nuclei in the copolymer.

6. A process for the preparation of a 2-hydroxy ethyl ester of an ethylenically unsaturated carboxylic acid, which process comprises feeding a liquid comprising the reactive ingredients, (1) a monoethylenically unsaturated organic carboxylic acid selected from the group consisting of acrylic acid and methacrylic acid and (2) ethylene carbonate to a reaction zone, wherein said reactants are contacted with one another and with an insoluble strongly basic quaternary ammonium anion exchange resin that is the reaction product of (A) an insoluble cross-linked copolymer of a predominant amount of an aromatic monovinyl hydrocarbon and a minor amount of an aromatic divinyl hydrocarbon having halomethyl radicals on aromatic nuclei in the copolymer, and (B) a tertiary amine, in the presence of a teritary amine having a dissociation constant between $1 \times 10^{-8}$ and $1 \times 10^{-10}$ at reaction temperatures between about 80° and 125° C., withdrawing reaction product from said reaction zone and recovering the 2-hydroxy ethyl ester.

7. A process for the preparation of 2-hydroxy ethyl acrylate, which process comprises feeding a liquid comprising approximately chemical equivalent proportions of ethylene carbonate and acrylic acid to a reaction zone, wherein they are contacted with one another and with an insoluble strongly basic quaternary ammonium anion exchange resin that is the reaction product of (A) an insoluble cross-linked copolymer of a predominant amount of an aromatic monovinyl hydrocarbon and a minor amount of an aromatic divinyl hydrocarbon having halomethyl radicals on aromatic nuclei in the copolymer, and (B) a tertiary amine, in particulate form, in the presence of a tertiary amine having a dissociation constant between $1 \times 10^{-8}$ and $1 \times 10^{-10}$ at reaction temperatures between about 80° and about 125° C., withdrawing reaction product from said reaction zone and recovering the 2-hydroxy ethyl acrylate.

References Cited by the Examiner
UNITED STATES PATENTS

| | | | |
|---|---|---|---|
| 2,697,080 | 12/54 | D'Alelio | 260—2.1 |
| 2,794,785 | 6/57 | D'Alelio | 260—2.1 |
| 2,929,835 | 3/60 | Hayes | 260—486 |
| 3,059,024 | 10/62 | Goldberg | 260—486 |

OTHER REFERENCES

Peppel: Ind. and Eng. Chem., volume 50 (1958), pages 767–770.

LORRAINE A. WEINBERGER, *Primary Examiner.*
LEON ZITVER, *Examiner.*